United States Patent
Ady et al.

(10) Patent No.: US 7,011,563 B2
(45) Date of Patent: Mar. 14, 2006

(54) WILD GAME CALL

(75) Inventors: Daniel D. Ady, Nampa, ID (US); Don Laubach, Gardiner, MT (US)

(73) Assignee: Donald R. Laubach, Gardiner, MT (US)

( * ) Notice: Subject to any disclaimer, the term of this patent is extended or adjusted under 35 U.S.C. 154(b) by 0 days.

(21) Appl. No.: 10/894,932

(22) Filed: Jul. 19, 2004

(65) Prior Publication Data

US 2005/0048868 A1    Mar. 3, 2005

Related U.S. Application Data (60) Provisional application No. 60/561,215, filed on Apr. 9, 2004, provisional application No. 60/488,509, filed on Jul. 18, 2003.

(51) Int. Cl.
*A63H 5/00* (2006.01)
(52) U.S. Cl. .................. 446/207; 446/209; 84/383 A
(58) Field of Classification Search ........ 446/207–209; 84/382, 383 A, 383 R, 330
See application file for complete search history.

(56) References Cited

U.S. PATENT DOCUMENTS

| | | | |
|---|---|---|---|
| 387,338 A * | 8/1888 | Canney | 446/192 |
| 3,722,133 A | 3/1973 | Morgan | 46/178 |
| 3,811,221 A | 5/1974 | Wilt | 46/180 |
| 3,815,283 A | 6/1974 | Piper | 46/178 |
| 3,955,313 A * | 5/1976 | Faulk | 446/208 |
| 4,048,750 A | 9/1977 | Wolfe | 46/180 |
| 4,179,845 A | 12/1979 | Jacob | 46/178 |
| 4,211,031 A * | 7/1980 | Gambino | 446/208 |
| 4,637,154 A | 1/1987 | Laubach | 43/1 |
| 4,764,145 A | 8/1988 | Kirby | 466/208 |
| 4,799,913 A | 1/1989 | Wolfe | 446/193 |
| 4,976,648 A | 12/1990 | Meline | 446/207 |
| 5,061,220 A | 10/1991 | Cooper | 446/208 |
| 5,415,578 A | 5/1995 | Jacobsen | 446/207 |
| 5,445,551 A | 8/1995 | Ady | 446/209 |
| 5,582,530 A | 12/1996 | Ady | 446/209 |
| 5,735,725 A | 4/1998 | Primos | 446/207 |
| 5,785,574 A | 7/1998 | Sears | 446/208 |

(Continued)

OTHER PUBLICATIONS

Primos 2004 Product Catalog.

*Primary Examiner*—Kien Nguyen
(74) *Attorney, Agent, or Firm*—Pedersen & Co., PLLC; Ken J. Pedersen; Barbara S. Pedersen (57) ABSTRACT

A game call includes a mouthpiece having a plurality of vibrating reed areas, and/or a mouthpiece that is adjustable relative to the housing, to produce unusual and complex sounds that are very much like wild game sounds. The plurality of reed areas may be two areas of a single tubular reed vibrating on different areas of the mouthpiece, and, preferably, vibrating on opposite sides of the mouthpiece. The opposite sides of the mouthpiece may include surface contours, including indentures, curvatures, or orifices, which cooperate with the vibrating reed and/or subsequently affect the air waves created by the vibrating reed. The mouthpiece cooperates with a housing, so that air from the user's mouth travels across the reed areas, creating vibrations in the air, which air vibrations travel into the housing resonating chamber, and out to the surrounding area. Modifying the reed, number and shape of the contours, indentures, and/or apertures, and/or the position of the mouthpiece relative to the resonating chamber, affects the sounds produced, allowing the mouthpiece to be adapted into calls for a variety of wild game species.

30 Claims, 10 Drawing Sheets

U.S. PATENT DOCUMENTS

| | | | |
|---|---|---|---|
| 5,885,127 A | 3/1999 | Colyer | 446/208 |
| 5,910,039 A * | 6/1999 | Primos et al. | 446/207 |
| 6,062,940 A | 5/2000 | Bean | 446/193 |
| 6,179,684 B1 | 1/2001 | Carlton | 446/207 |
| 6,435,933 B1 | 8/2002 | Browne | 446/207 |
| 6,471,563 B1 | 10/2002 | Carlton | 446/202 |
| 6,612,894 B1 | 9/2003 | Carlton | 446/202 |
| 6,709,309 B1 | 3/2004 | Bishop et al. | 446/213 |
| 6,752,681 B1 | 6/2004 | Bean | 446/208 |
| 6,767,270 B1 | 7/2004 | Primos | 446/207 |
| D497,564 S | 10/2004 | Primos et al. | D10/119 |
| 2003/0060121 A1 | 3/2003 | Oathout | 446/208 |
| 2003/0082988 A1 | 5/2003 | Gendron et al. | 446/207 |

* cited by examiner

WILD GAME CALL

This application claims priority of Provisional Application Ser. No. 60/488,509, filed Jul. 18, 2003, and entitled "Wild Game Call", which is hereby incorporated by reference, and also claims priority of Provisional Application Ser. No. 60/561,215, filed Apr. 9, 2004, and entitled "Wild Game Call".

BACKGROUND OF THE INVENTION

1. Field of the Invention

This invention relates generally to wild game calls used by hunters to attract game, and, more particularly, to wild game calls used to attract elk, turkey, or coyote.

2. Related Art

In the pursuit of wild game, such as elk, turkey, or coyote, for example, it is highly advantageous to use a call to simulate the various sounds emitted by the animal. This way, the animal may be enticed to come to the hunter. This is particularly so when hunting with a bow or camera and stalking game for short range contact. As elk and other large game animals make a wide array of sounds or calls, it is important that not only the simulation be a true one, but that the hunter be able to render several different calls.

Various U.S. Patents describe game calls of interest, including Laubach (U.S. Pat. No. 4,637,154) and Ady (U.S. Pat. No. 5,445,551 and 5,582,530), Morgan (U.S. Pat. No. 3,722,133), Wilt (U.S. Pat. No. 3,811,221), Piper (U.S. Pat. No. 3,815,283), Kirby (U.S. Pat. No. 4,764,145), Meline (U.S. Pat. No. 4,976,648), and Primos (U.S. Pat. No. 5,735,725).

The proliferation of game calls of varying effectiveness has had unforeseen and unintended consequences. For example, the increased use of game calls that do not closely approximate the actual sounds that animals produce has caused game animals to become wary of calls and increasingly able to discriminate between real and artificial calls. This has led to the need for calls better able to reproduce authentic sounding calls. Thus, despite past efforts, there is need for more accurate game calls that are also readily mastered by novice users.

SUMMARY OF THE INVENTION

The present invention comprises a game call with a mouthpiece that has a plurality of sound-producing regions and/or that is adjustable, for producing a variety of natural animal sounds. The game call may be used, for example, for hunting, wildlife observation, wildlife photography, or other purposes.

Embodiments of the game call that feature a plurality of sound-producing regions may have a plurality of separate reeds vibrating on or near different areas of the mouthpiece. Alternatively, the reed system may be comprise multiple portions of a single reed vibrating on or near different areas of the mouthpiece, for example, two portions of a tubular reed vibrating on opposite sides of the mouthpiece.

The different areas of the mouthpiece on or near which the reed or reed portions vibrate may be opposite sides of the mouthpiece and may include surface contours, including indentures and apertures and curvatures, for example, which cooperate with the vibrating reed and/or subsequently affect the air waves created by the vibrating reed, to produce unusual and complex sounds that are very much like wild game sounds. In some embodiments, the surface contours, indentures, and apertures are identical or substantially identical on each opposite side of the mouthpiece, so that the mouthpiece may be called "bilaterally symmetrical." Alternatively, the surface contours (indentures, apertures, curvatures, for example) may be different on each side of the mouthpiece, so that the call is still two-sided, but not exactly or not even substantially symmetrical. Modifying the number and shape of any indentures and apertures affects the sounds produced, allowing the mouthpiece to be adapted into calls for a variety of wild game species.

Embodiments of the game call that feature an adjustable mouthpiece preferably allow the vibrating reed(s), and/or the surfaces near which the reed(s)vibrate, to be moved relative to the game call housing or other resonating chamber. In an especially-preferred embodiment, the mouthpiece is slidable in and out of a housing to adjust the length of the mouthpiece to fit the lips of the user and to adapt the mouthpiece to make alternative sounds.

DETAILED DESCRIPTION OF THE INVENTION

Referring to the Figures, there are shown some, but not the only, embodiments of the invented wild game call. The preferred embodiment is designed to function as a bull elk call, but may be modified to function as a call for various game animals, including cow elk call, coyote call, turkey call, etc.

The preferred embodiment of the present invention is a "two-sided" wild game call, which includes two reed portions that each vibrate against, or generally in, a different area of the game call mouthpiece. The preferred game call includes a mouthpiece that is received in the user's mouth and has two opposing surfaces, a top surface and a bottom surface, against or near which a portion of a cylindrical/tubular reed vibrates. Thus, the game call may be called "a two-sided" wild game call, because the structure creating the desired sounds is on two sides of the mouthpiece. The structure creating sound on each side of the mouthpiece may be different, similar, substantially the same, or identically the same, as desired to produce a variety of sounds or to please a particular user. In instances wherein the structure on the two sides of the mouthpiece is substantially or identically the same, the game call may be called "bilaterally symmetrical."

Figures 8, 9, 10, 11, 12, 13:
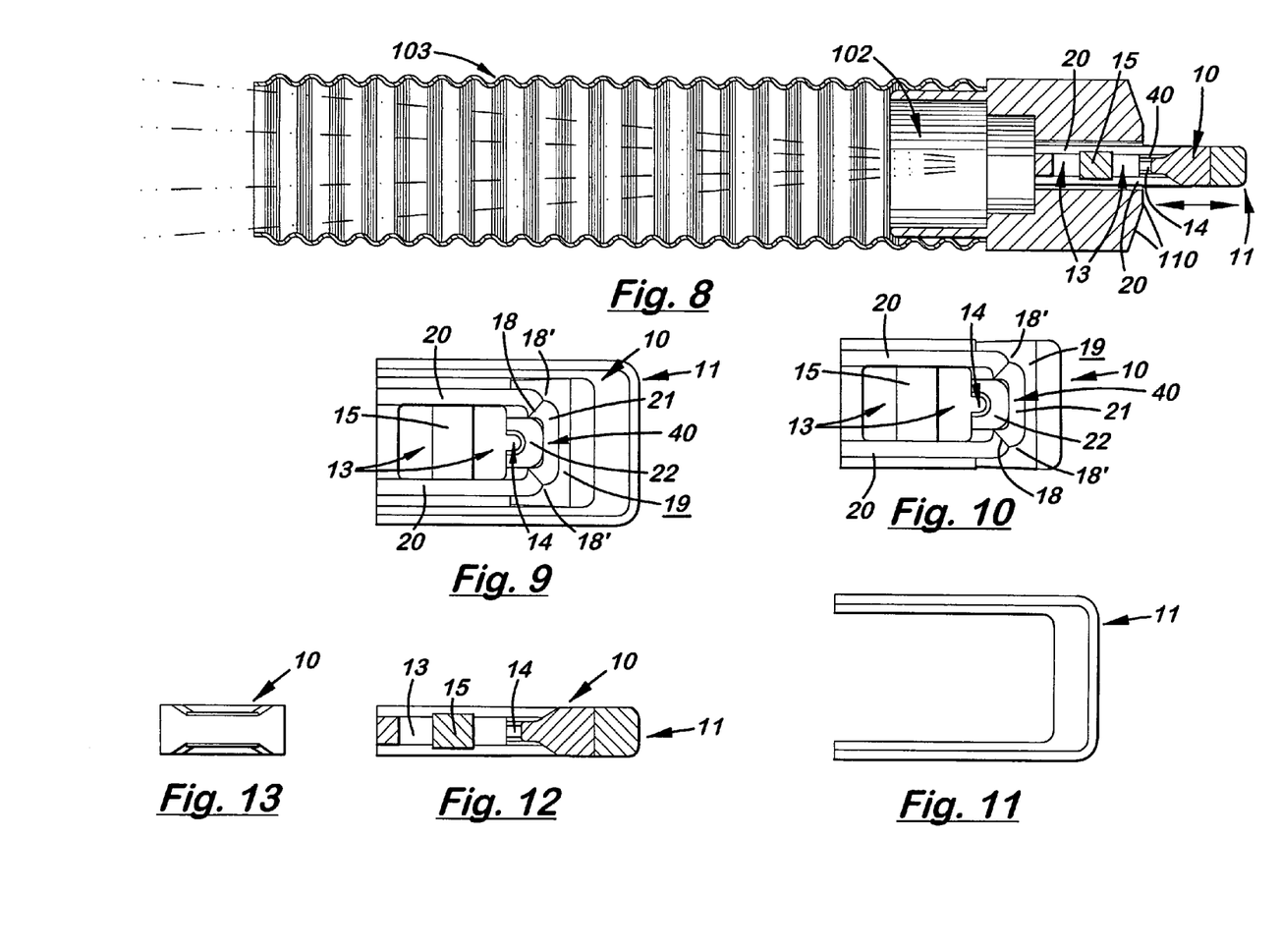
FIG. 8 is a side, cross-sectional view of the embodiment of FIGS. 1–7, attached to an optional flexible resonating tube.
FIG. 9 is a top view of the mouthpiece and mouthpiece holder of embodiment FIGS. 1–8, including an optional restrictor and with the reed removed.
FIG. 10 is a bottom view of the mouthpiece of FIG. 9, with mouthpiece holder removed.
FIG. 11 is a top view of one embodiment of the mouthpiece holder of FIGS. 1–9.
FIG. 12 is a cross-sectional side view of the mouthpiece of FIG. 9 (including mouthpiece holder and restrictor in place, and with reed removed).
FIG. 13 is a distal end view of the mouthpiece without holder of FIG. 10.

As shown to best advantage in FIGS. 1–3 and 8, the mouthpiece is inserted or otherwise connected to a housing or "body," which includes a resonating chamber. Optionally, the housing may be extended to lengthen the resonating chamber or connected to a flexible resonating tube (FIG. 8). Thus, vibrating reed(s) over or near the contours of the mouthpiece create(s) air waves that travel along or through the mouthpiece and through the resonating chamber of the body, creating the desired sounds. In embodiments including a flexible resonating tube, air waves travel from the housing resonating chamber into and through the flexible resonating tube, which may increase the volume and may change the tone and pitch.

Each of the two sides of the preferred mouth piece may be said to comprise supporting surfaces and recessed surfaces. The support surfaces contact and support the reed inner surfaces and preferably prevent air from passing underneath the proximal edge of the reed. The recessed surfaces, which are preferably recessed relative to the support surfaces, either do not contact the reed at all or only contact the reed during part of the reed's vibration. The recessed surfaces, combined with apertures, grooves, channels, or other open spaces in communication with the resonating chamber, help create a space underneath or near the reed(s) in which the reed may vibrate to create the desired sounds and spaces along which the sound waves may travel. Thus, the recessed surfaces and/or the shape and size of the air passageways into or through the resonating chamber may be changed to create many different calls that are particularly effective for creating various animal sounds.

In the embodiments shown in the FIGS. 1–19, the support surfaces comprise a portion of the top surface of the mouthpiece (for the top reed or reed portion), and a portion of the bottom surface of the mouthpiece (for the bottom reed or reed portion). For a tubular reed, the support surfaces may be said to also comprise a portion of the right and left side surfaces of the mouthpiece, as the reed encircles the mouthpiece.

The preferred recessed surfaces form a contoured "shelf" 40 on each of the top and bottom sides of the mouthpiece. Each shelf may include a concave bowl or other concave area, and a canal or other depression of smaller dimensions than the concave area and located centrally on the distal end of the sound-producing "shelf". The canal may extend all the way through the mouthpiece "shelf" near the distal end of the bowl, in effect, being formed by the distal perimeter edge of the shelf. Alternatively, the canal may be replaced by a depression in that same general area that does not extend all the way through the "shelf".

Distal of the shelf perimeter edge and its canal is an aperture that is relatively very large compared to the canal, and that preferably extends all the way through the mouthpiece from the canal region to near the distal end of the mouthpiece. The border between the bowl and canal region and the aperture may be called a "breakline" 42, that is, the generally transversely-extending corner between the upward-facing surfaces under the reed and the generally forward-facing surfaces of the canal and the rear side of the aperture. The breakline 42, therefore, is the transition between the surfaces near which the reed vibrates and the opening(s) generally in front of the reed which allows air and air vibration to travel into the housing and optionally into a flexible tube. In many embodiments, the shape of the breakline is believed to be important for creating the desired tones, and it may be altered to various shapes to create alternative sounds.

Figure 2:
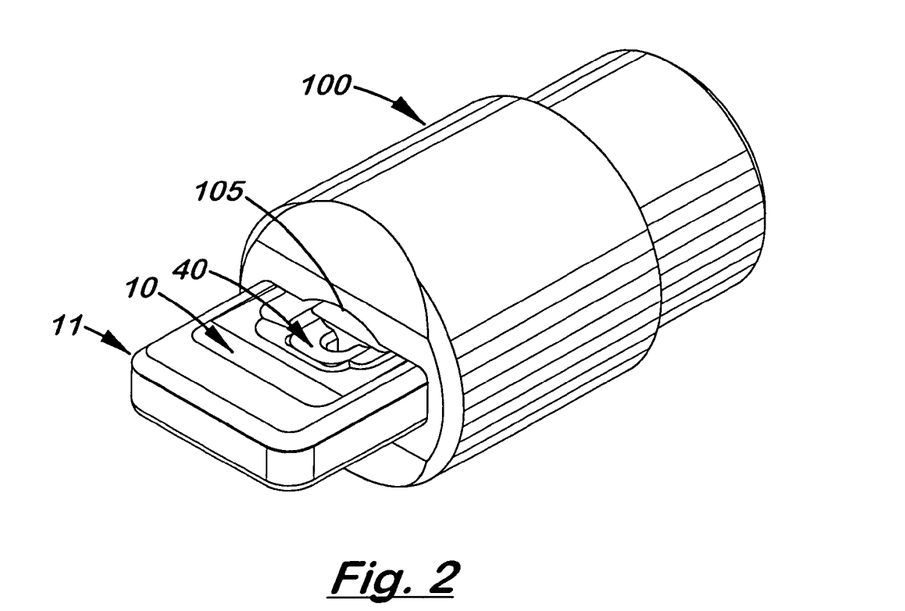
FIG. 2 is a perspective view of the embodiment of FIG. 1 with the reed removed.
Figure 3:
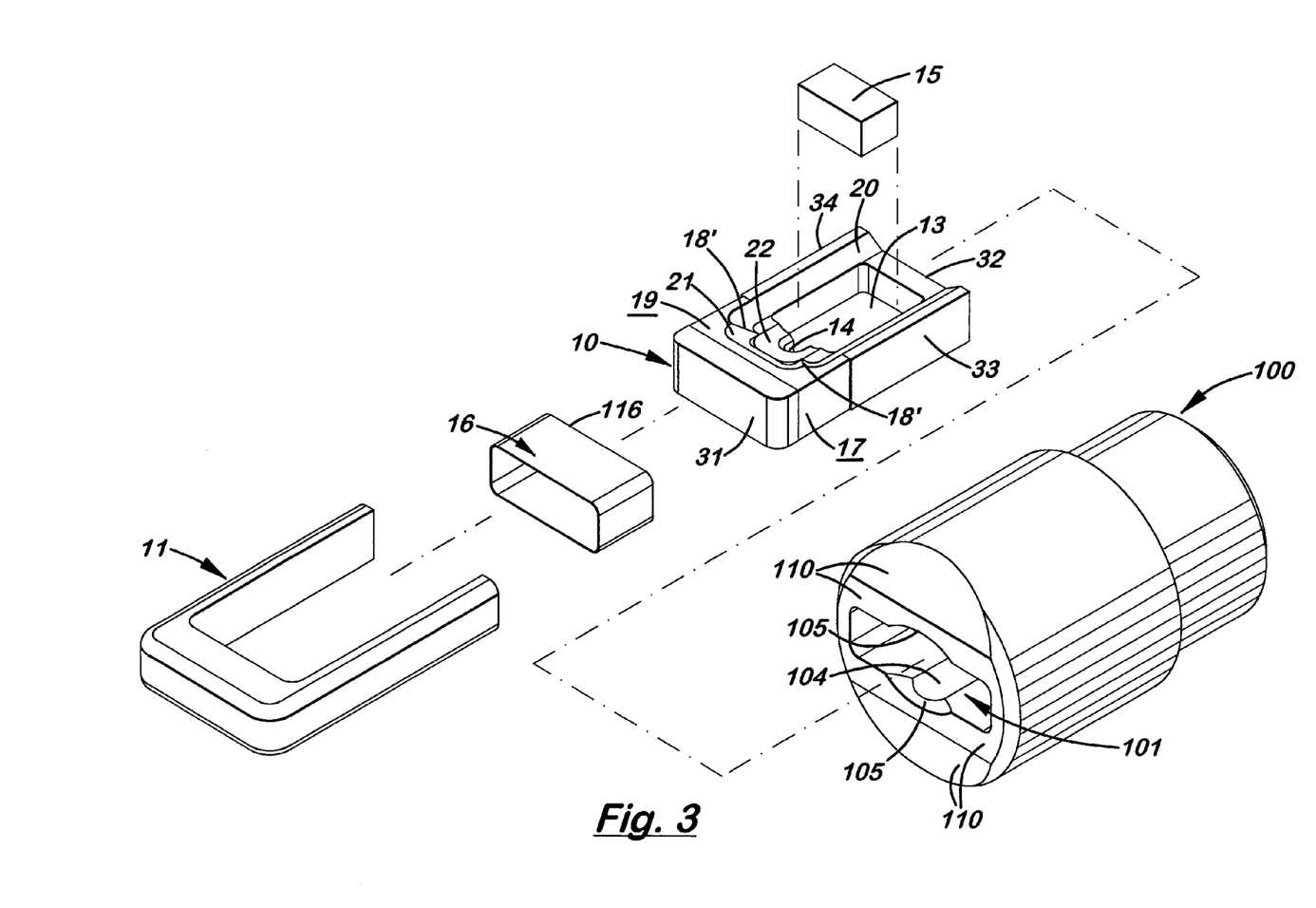
FIG. 3 is an exploded view of the embodiment of FIGS. 1 and 2.
Figure 4:
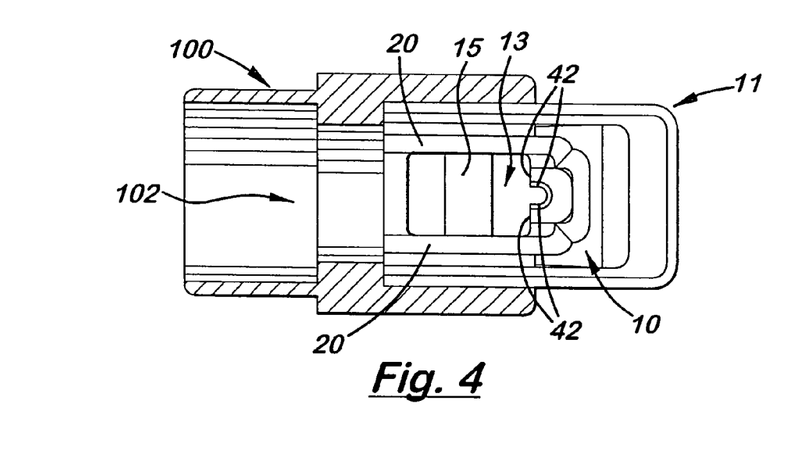
FIG. 4 is a top view of the embodiment of FIGS. 1–3, without the reed, wherein the housing is shown in cross-section to reveal the mouthpiece. The end of the game call to the right of the page is called the "proximal end" as it is placed in the user's mouth, and the end to the left of the page is called the "distal end".
Figure 5:
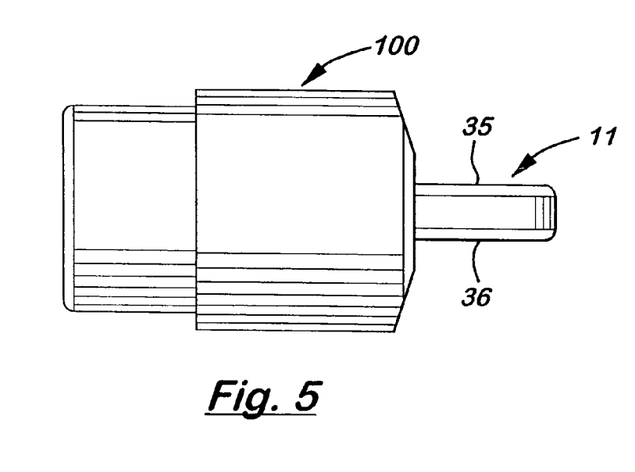
FIG. 5 is a side view of the embodiment of FIGS. 1–4.
Figure 6:
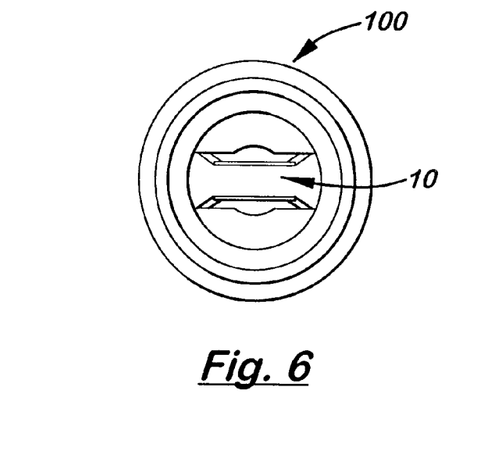
FIG. 6 is a distal end view of the embodiment of FIGS. 1–5.
Figure 7:
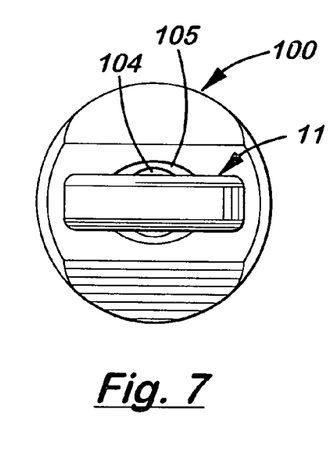
FIG. 7 is a proximal end view of the embodiment of FIGS. 1–6.

As shown to best advantage in FIGS. 3 and 5, the preferred mouthpiece is generally elongated and rectangular, with a proximal (rear) end 31, a distal (front) end 32, a right side 33, and a left side 34, a top side 35, and a bottom side 36. A reed, which is generally a flexible piece of material capable of vibrating to create sound, is provided on the mouthpiece. Various reeds, such as used in game, musical, or other whistles or calls, may be used in a two-sided call according to embodiments of the invention, however, the preferred reed is a generally elastic member forming a ring or band with a width significantly greater than its thickness. FIG. 3 illustrates reed 16 in its form stretched around the mouthpiece, but, prior to installation, the reed would actually be relaxed into a tubular/cylinder form. The preferred band-style reed provides two identical or substantially identical reed portions formed from a single piece of material. As shown to best advantage by comparing FIGS. 1 and 2 and by viewing exploded FIG. 3, the preferred reed 16 stretches around the circumference of the mouthpiece holder near the proximal end, partially supported by the top and bottom surfaces of said mouthpiece. The reed 16 is preferably received and held in place by recessed reed-holding surfaces 17 and 19 on its sides and top and bottom surfaces (FIG. 3).

The preferred cylindrical/tubular reed may be a Latex™ reed, a Nitril™ reed, or another elastic reed as may be known to those of skill in the game call arts. Particularly preferred reeds are those that stretch to fit around a mouthpiece that is about 1 inch across from right to left side and about ⅜inch from top to bottom side, and, in doing so, stretch to about 0.004 inch thickness.

Figure 1:
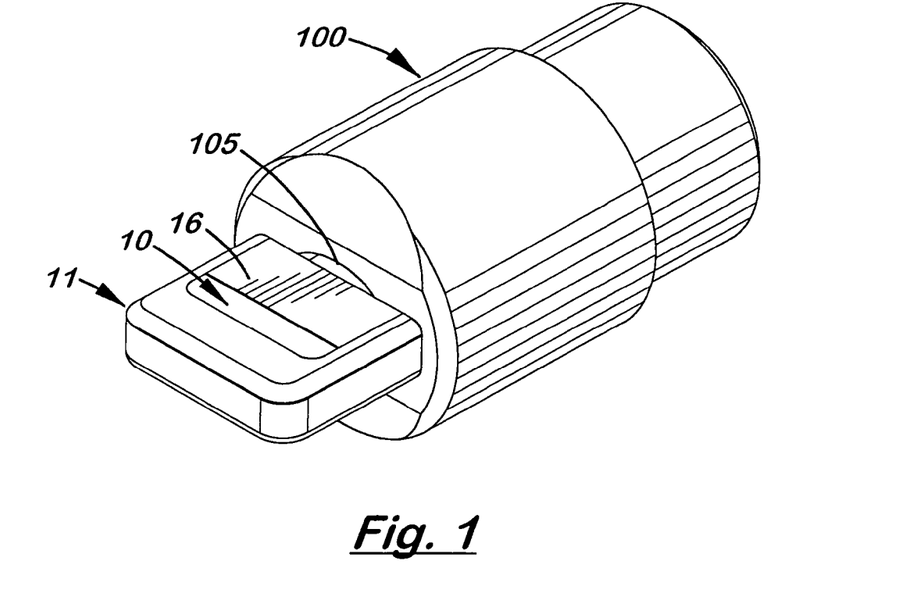
FIG. 1 is a perspective view of one embodiment of the invented call with a reed in place.

The reed is preferably positioned directly above the contoured shelf 40, as shown in FIGS. 1 and 2, but the distal edge of the reed also may be placed forward or rearward relative to the position shown in the Figures. In other words, the distal edge of the reed may extend forward over the aperture 13, or may be retracted to terminate over the bowl. In general, however, only the portions of the reed that are not contacted by the mouthpiece surface are free to vibrate, so the reed placement and the reed distal edge placement may affect the sounds produced by the call.

Referring again to FIGS. 1–3, the preferred embodiment includes a mouthpiece 10 that receives reed 16 and then fits into a generally U-shaped mouthpiece holder 11 to form a mouthpiece-holder combination, and this combination is inserted into receiving slot 101 of the proximal end of housing 100. The distal end of the housing 100 may be attached to a flexible resonating tube 103 by a frictional fit or other attachment means (FIG. 8). The mouthpiece 10, mouthpiece holder 11, and housing 100 may be bilaterally symmetrical, in which case any features described in the top or bottom surface of the mouthpiece, holder, or housing may be also preferably present in a similar or identical form on the respective element's opposite surface. Alternatively, the opposite sides of each of the mouthpiece, holder, or housing may be different, and one of skill in the art will understand, after reading this Description and viewing the Drawings, how the opposite sides of these elements may be varied.

The mouthpiece 10 includes a recess system comprising one or more recessed/concave surfaces extending laterally across the proximal end of the mouthpiece. One preferred recess system, shown to best advantage in FIGS. 3 and 9, includes a semi-circular recess area that may be formed by cutting a first longitudinal channel (with channel sides 20), into the top surface, and also a second longitudinal channel (with rounded end surface 21 of smaller width compared to the first longitudinal channel) into the top surface. At the intersection of the walls of the first longitudinal channel and the second longitudinal channel are ridges 18 and ridge points 18', as shown in FIGS. 3 and 9. Identical or substantially similar semi-circular recessed area (e.g. channel sides 20, end surface 21, ridges 18, and ridge points 18') may be provided on the opposite (bottom) side of the mouthpiece.

Also provided in both the top and bottom mouthpiece surfaces are bowl 22 (preferably about a half-circular bowl), extending forwardly and concavely from the distal edge of the rounded end surface 21. A small canal 14 at the distal edge of the bowl 22 may be provided, as well as a generally rectangular orifice 13 at the distal edge of the bowl and canal (wherein the distal edge of the bowl and canal is called the "breakline," discussed above). These recesses and apertures preferably are provided in both the top and bottom mouthpiece surfaces. The canal 14 and the orifice 13 may extend all the way through the mouthpiece from the top surface to the bottom surface.

Figure 17:
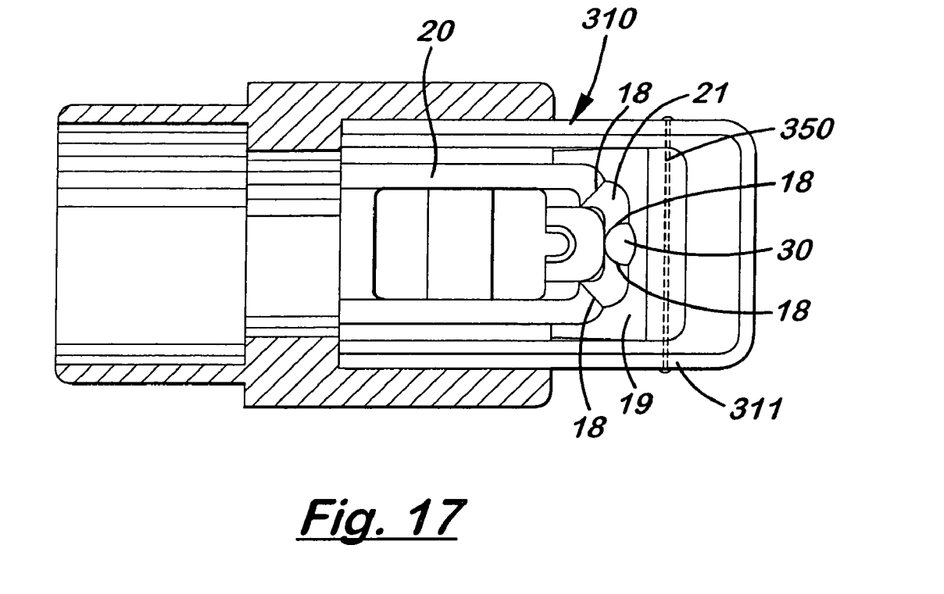
FIG. 17 is a top view of an alternative embodiment of the game call, with housing shown in cross-section, wherein the proximal recess area is adapted to have multiple recesses separated by ridges.
Figure 17A:
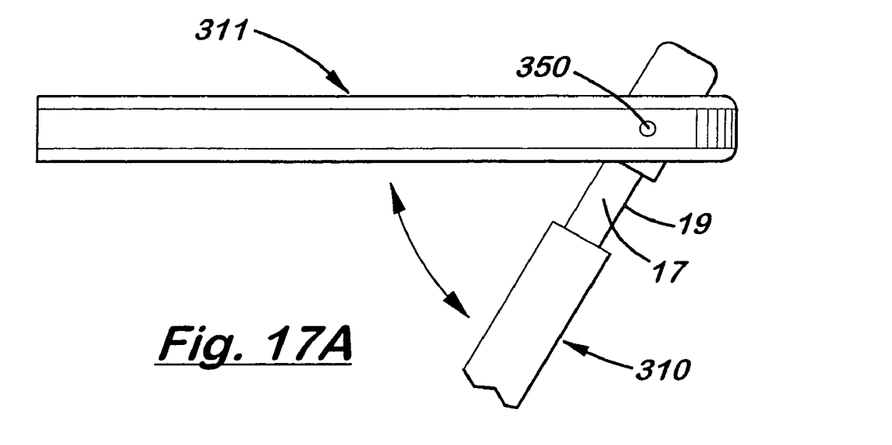
FIG. 17A illustrates the pivotal feature of the embodiment of FIG. 17, wherein the mouthpiece is pivoted relative to the mouthpiece to a position in which the reed may be easily installed or removed.

The mouthpiece 10 may be held in place in the holder 11 preferably with a frictional fit or other means such as a pivotal connection (see FIG. 17A). The entrance of the receiving slot 101 may be slightly enlarged, with ramped sections 105 above and below the mouthpiece 10. The ramped sections 105 create a passage for the air/air waves passing over or emanating from the reed 16, to enter the call and to travel through the housing 100. A longitudinal groove 104 preferably passes down the center of the top and bottom surfaces of the receiving slot 101. The shape of the groove 104 affects the sound waves as they pass from the end of the mouthpiece 10 into the receiving slot 101 and into the resonating chamber 102. The longitudinal groove 104 in the preferred embodiment may be appropriate for a bull elk call, but the depth, width, and curvature of the groove may be altered as necessary to create different sounding calls. For example, see the alternative ramped sections and groove in FIG. 19.

The mouthpiece holder 11 and receiving slot 101 cooperate so that the mouthpiece-holder combination may be inserted into the housing to a varying extent, so that the distance between the distal edge of the reed and the proximal surface of the housing 110 may be adjusted by sliding the mouthpiece father into, or out from, the receiving slot. The preferred position of the mouthpiece-holder combination places the reed 16 just outside the housing 100, so that the user's lips contact the reed both on the top and bottom of the mouthpiece while also abutting against the proximal surface of the housing 110, as shown in FIG. 1. This way, the lips' contact with the housing blocks air from escaping from the mouthpiece into the surroundings without traveling through the housing. This slidable adjustment of the mouthpiece relative to the holder allows a game call to be adapted to match the size and proportions of a particular user's lips.

A sportsman uses the call by placing the proximal end of the mouthpiece 10 and mouthpiece holder 11 in his mouth, pressing his upper and lower lips varying amounts on the reed, and blowing or humming or singing into the mouthpiece, so that air passes across the reed 16 into the housing 100. The reed 16 vibrates and sound is created that resonates inside the housing 100 in the resonating chamber 102 and in optional resonating tube 103. The sound produced by "playing" the game call depends on the design of the game call (given the many possible contours of its sound-producing regions), the reed, the airflow into the call, the pressure of the user's lips on the call, and any sound, punctuation, and rhythm produced by the user while blowing.

Figure 14:
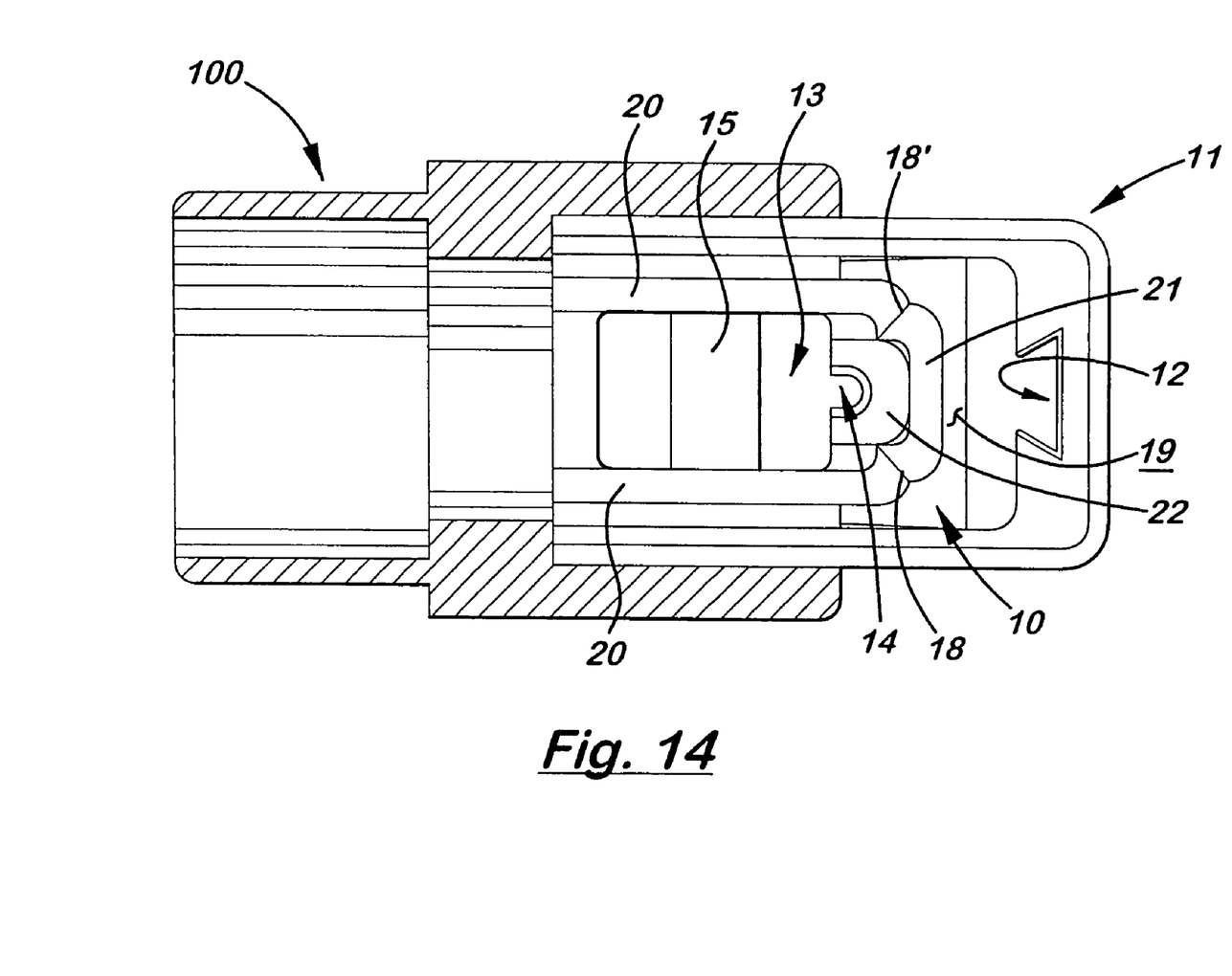
FIG. 14 is a top view of an alternative embodiment of game call with a dove-tail attachment connecting the mouthpiece to the mouthpiece holder. The game call is shown without the reed and with the housing in cross-section to reveal the mouthpiece.

Preferably, the mouthpiece 10 is inserted into the mouthpiece holder 11 from above or below to protect and preserve the reed 16, because sliding the mouthpiece 10 longitudinally into the mouthpiece holder 11 may cause the edge of the reed 16 to curl up and be damaged. Thus, embodiments may contain a mating mechanism to prevent such horizontal movement and resulting damage to the reed 16. As shown in FIG. 14, one such mating mechanism may be cooperating dovetail structure 12 that prevents the mouthpiece from being pulled out longitudinally but that allows the mouthpiece to be raised or lowered out of the mouthpiece holder in a direction into or out the paper in FIG. 14. Another mechanism for managing the mouthpiece-holder combination is a pivotal connection between the mouthpiece and the holder, as shown in FIG. 1 7A and as described later in this Description.

Figure 15:
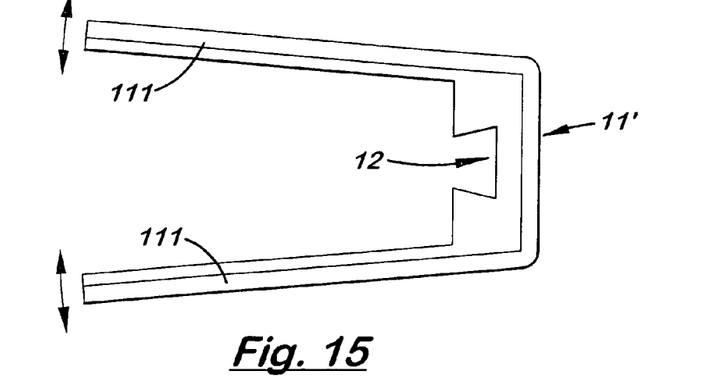
FIG. 15 is a top view of an alternative mouthpiece holder with flexible and resilient arms.

Optionally, the mouthpiece holder may be manufactured from a material that can be lightly compressed to insert into the housing 100 and will then expand to strengthen the frictional grip holding the mouthpiece 10 and mouthpiece holder 11 in place. Or, as shown in FIG. 15, the holder 11' may be made of a somewhat flexible and resilient material, so that the arms 111 tend to spring slightly outward when the mouthpiece and holder are not in the housing 100 and yet so that the arms 111 may be pushed inward toward each other and toward the mouthpiece for being inserted into the housing. This way, the resilience of the arms 111 will push outward slightly on the housing to increase the force of the frictional fit of the holder with the housing.

Alternatively, the mouthpiece may be designed without a holder 11. While a holder, or other structure to cover and protect portions of the reed, is preferred, there may be mouthpiece and/or reed designs that allow the mouthpiece to be inserted into a housing and used without damaging the reed. Also, there may be designs wherein the mouthpiece is permanently or semi-permanently attached to the housing, including embodiments wherein the mouthpiece may be an integral one-piece unit with the housing, and, for example, wherein the reed is installed from the proximal end of the call without detaching the mouthpiece from the housing. Thus, while the figures show preferred versions of mouthpiece, holder, and housing, other arrangements and other structures may be may be included according to various embodiments of the invention.

The preferred reed 16 is a bi-lateral reed with two separate vibrating areas, and this double-reed configuration has unexpected benefits. The double-reed may create twice the volume of sounds, making the call easier to use and audible over a much larger area. Also, although the preferred mouthpiece has the same contours (recesses and apertures) on both sides under portions of a reed that are the same material, still the sounds created by each side of the mouthpiece tend to be slightly different. This is chiefly because of the differences in the mouth and lips, and the pressure of the lips upon each side of the mouthpiece, and also because of the interferences of the sound waves from the two sides as the waves travel through the game call. Therefore, two sets of sound waves are believed to be created, one from each side of the mouthpiece, and the mixing and resonating of these sound waves in the housing and optional tube create very complex and interesting effects. For example, the double-reed amplifies and improves the call's "growl," which is the dominant-aggressive growl sound made by bull elk when confronting or warning another male. The desirable "growl" sound is known to those of skill in the art as a very desirable sound in a bull elk call, and as a difficult sound to make. The excellent "growl" of the invented game call according to some embodiments of the invention is believed to be a by-product of multiple vibrating surfaces making similar, but not identical, sounds. Increasing and improving the quality of the "growl" makes the sounds from the invented game call more realistic.

Referring more specifically to preferred features of the game call, with particular reference to FIGS. 9–13:

The mouthpiece 10 of the preferred embodiment is generally rectangular in shape and has a proximate end and a distal end. The sides of the mouthpiece 10 include side reed-holding surfaces 17, which are sized to receive the reed 16 and provide a gap between the mouthpiece 10 and the mouthpiece holder 11 to provide a space for the reed 16. Also, each side reed-holding surface 17 is preferably, but not necessarily, tapered slightly so that it is deeper on the distal side than on its proximal side so that the reed 16 is less taught along its distal edge, which may facilitate greater vibration on that edge during use. For example, the taper may be about 2 degrees from parallel to the sides of the mouthpiece 10, and is preferably less than 5 degrees. Although the taper is preferred for a bull elk call, as one means for adjusting the tension of the proximal region of the reed, it is not necessary and preferably is omitted from certain calls, such as cow elk calls or coyote calls.

Roughly rectangular orifice 13 traverses the mouthpiece 10 from top to bottom. It extends from near to the distal end of the mouthpiece 10 to just short of the distal end of the reed-holding surface 17. Roughly semi-circular canal 14 also preferably traverses the mouthpiece 10 and opens into the orifice 13—i.e., the canal 14 and orifice 13 are connected and form a single open volume within the mouthpiece 10.

An optional restrictor 15 may be placed within the orifice 13. It is preferably held in place with a frictional fit allowing it to be positioned at any point within the orifice 13. Although shown as a rectangle, the restrictor 15 may be given any convenient shape. The restrictor 15 alters the sound produced by reducing the volume and changing the shape of the orifice 13 and resonating chamber 102.

The channel sides 20 may be said to extend from the distal end of the mouthpiece 10, along the edges of the orifice 13, and past the orifice to a point roughly halfway under the reed 16 on the top and bottom of the mouthpiece 10. The rounded end-surface 21 may be considered the closed end of another (second) longitudinal channel, and the end-surface 21 extends slightly further from the proximal end of the channel sides 20 toward the proximal end of the mouthpiece 10. The first longitudinal channel (channel sides 20) and second longitudinal channel (rounded end-surface 21) may be of equal depth. Ridges 18 with ridge points 18' lie at the locations where the channel sides 20 and the end-surface 21 meet.

Preferable, shallowly-depressed reed-holding surface 19 is located on both the top and bottom surfaces, for receiving the reed 16 to keep it in the proper place. The proximal ends of the channel sides 20 and the rounded end-surface 21 are located within the region of the reed-holding surface 19. The surface 19, which extends between the side reed-holding surfaces 17 under the reed 16, plus the ridge points 18', are supporting surfaces that tend to stay in contact with the reed, support the reed 16, and prevent it from vibrating directly above surfaces 19 and 18', and, thus, prevent air from passing underneath the reed (between the reed and the mouthpiece). A tight fit between the reed 16 and the proximal edge of the top and bottom reed-holding surface 19 is preferred to prevent air from passing between the reed 16 and the mouthpiece 10. This tends to confine the vibration to the more distal areas of the reed 16 above the bowl 22 and canal 14. It is believed that, as a result of the air pressure imparted against the outer surface of the reed by the user, the reed may curve/stretch to flatten against or otherwise contact the channel sides 20 and the rounded end surface 21, and this contact may further help prevent air from passing underneath the reed rather than over it. The ridges 18 and ridge points 18' may help prevent the reed from sticking permanently to the channel sides 20 and end surface 21 during use of the call, or may otherwise affect the tone and pitch. While the ridges 18 and ridge points 18' are found to be beneficial in some calls according to the invention, they are not required in all embodiments.

The channel sides 20 and rounded end-surface 21 are preferably sloped. Preferably, the perimeter of the rounded end surface 21 is sloped inward at approximately 25 to 45 degrees relative to the horizontal mid-plane. The channel sides 20 are preferably, but not necessarily, sloped the same as the end-surface 21, for ease of manufacture. The depth of the longitudinal channels (resulting in channel sides 20 and end surface 21) may affect the effort required to use the call.

Surrounding the canal 14 at the proximal end of the orifice 13 and in between the canal and the perimeters of the channel sides 20 and the rounded end-surface 21 is the shallow, roughly semi-circular bowl 22. The sides of the bowl 22 are preferably flat with the bottom slightly rounded. The transition 23 between the canal 14 and bowl 22 is preferably sloped at 60 degrees relative to the horizontal mid-plane. This creates a smoother sound during break-over notes because it stops the reed 16 from sticking to the surface of the mouthpiece 10. Although the canal 14 is shown as semi-circular, it may be U-shaped, oblong, or V-shaped, or non-existent, as desired for a particular application. For example, see alternative canal 214 in FIG. 16, alternative canal 414 with transition 423 in FIG. 16A, substantially straight breakline 542 and depression 514 rather than a "canal" in FIG. 18A, a recessed shelf 614 with no depression or canal in FIG. 18B.

Figure 16:
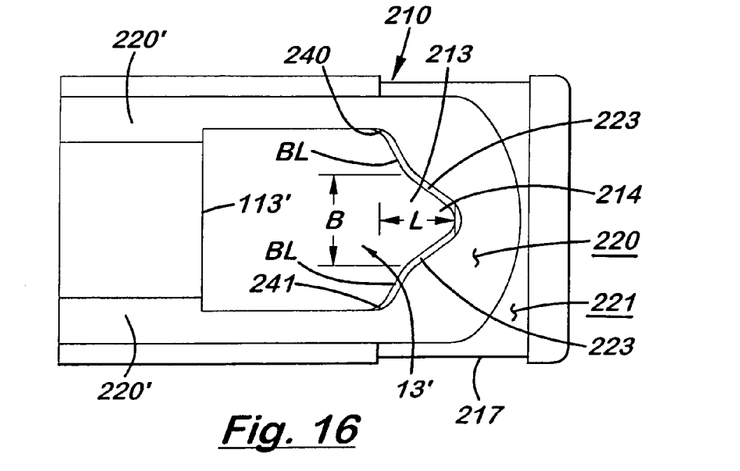
FIG. 16 is a top view of an alternative embodiment of the mouthpiece, featuring alternative contours and curvatures in the sound-producing regions, which may be adapted to function as a cow elk and/or coyote call.

The mouthpiece 210 embodiment of FIG. 16 differs from the preferred embodiment in a few significant ways. Rather than several, separate channel surfaces in the proximal end of the mouthpiece (that is, rather than channel sides 20 being separated from end-surface 21 by ridges 18), the generally semi-circular recessed area of mouthpiece 210 includes a single concave surface 220 extending substantially all the way across the mouthpiece and distally along the mouthpiece at 220'. Ridges 18 and ridge points 18' are eliminated. This design with the single concave surface 220 may be said to comprise a single rounded-end surface without a separate bowl, or may be said to comprise a larger bowl without a separate rounded-end surface. Further, the orifice 13' is smaller by nearly half, in that the distal end of the orifice 113' is closer to the proximal end of the mouthpiece 210. The proximal end of the orifice 213 is also shifted slightly closer to the proximal end of the mouthpiece 10. The canal 214 is larger than in mouthpiece 10 and defined by more gradually-curving walls. Mouthpiece 210, therefore, may be said to feature a slightly-recessed reed-holding support surface 221, side reed-holding surfaces 217 and concave surface 220. The concave surface 220 curves along transition surface 223 into the canal 14, substantially all along the length of the breakline (from corner 240 to corner 241). The canal is broader (dimension B in FIG. 16) and longer (dimension L in FIG. 16) than in the embodiment of FIGS. 1–13. Also, the breakline BL is curved more gradually from its outer corners to the canal 224 compared to the breakline 42 of FIGS. 1–13.

Figure 16A:
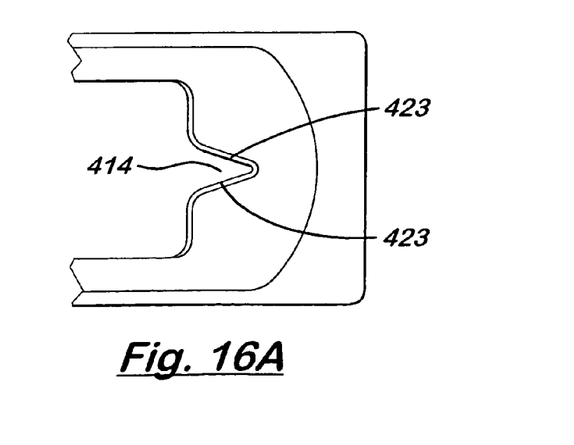
FIG. 16A illustrates yet another set of alternative contours and curvatures, including a V-shaped curvature near which the reed may vibrate.

The modifications shown in FIG. 16 are particularly appropriate for use as a cow elk call and/or a coyote call, wherein more slurred sounds are desired, rather than the sharper, more separated notes of the bull elk. The dimensions B and L and the curvature of the breakline BL may be modified for fine-tuning the call for other desired sounds. For example, as illustrated in FIG. 16A, a more sharply V-shaped canal 414 is provided, with transition 423, and with a breakline BL that on either side of the canal is generally perpendicular to the right and left side of the mouthpiece.

The mouthpiece 310 embodiment of FIG. 17 is similar to mouthpiece 10, except that a short third channel or depression 30 is added at the center of the rounded end surface 21. This increases the number of ridges 18, and may serve to improve position of the reed against the end-surface 21 and against ridges 18. While it may be desirable for the reed to curve/stretch down into the depressions represented by the rounded end surface 21 and the depression 30, the multiple ridges 18 are believed to be beneficial for preventing the reed from sticking to these surfaces.

Optionally, as shown in FIG. 17A, the mouthpiece 310 may be pivotally attached to the holder 311, so that "removing" the mouthpiece to remove or install a reed comprises pivoting the mouthpiece into and out of the plane of the holder. A pivot pin 350, shown in dashed line in FIG. 17, extends through the holder and the mouthpiece near the proximal end of the mouthpiece. This way the mouthpiece may be pivoted away from the holder to expose the proximal area of the mouthpiece for installation of the reed. Such a pivotal connection allows reed installation without separating the mouthpiece from the holder. Alternatively, the pivotal connection may be at the opposite end of the mouthpiece, for example, so that the proximal end of the mouthpiece pivots out away from the holder. The embodiment of FIGS. 17 and 17A, it may be noted, does include recessed reed-holding surfaces 17 and 19, but the side reed-holding surfaces 17 are not slanted from their proximal to distal edges as they are in the embodiment of FIG. 1–13.

While not all sides of the alternative embodiments of FIGS. 14–17A are shown, it is be understood that, preferably, these mouthpieces/calls, like the embodiment of FIGS. 1–13, have two reed portions and two mouthpiece portions upon which the reed portions vibrate. Further, the embodiments of FIGS. 14–17A may be bilaterally symmetrical, that is, with substantially the same or the identical structure on both the top and bottom surfaces of the mouthpiece. Alternatively, different structure may be provided on opposite sides of the mouthpiece, as discusses above. For example, the contours of the mouthpiece of FIGS. 1–13 may be provided on one side, and the contours of the mouthpiece of FIGS. 17, 16, 16A, 18A, or 18B may be provided on the other side.

Figure 18A:
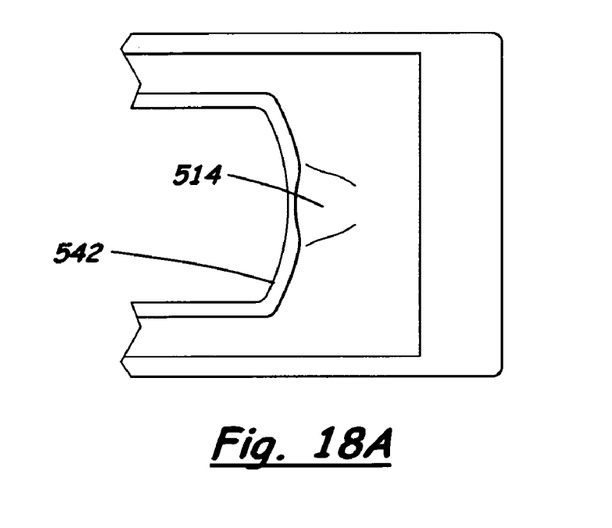
FIG. 18A is a partial top view of an alternative mouthpiece including a central depression rather than a canal extending through the mouthpiece.
Figure 18B:
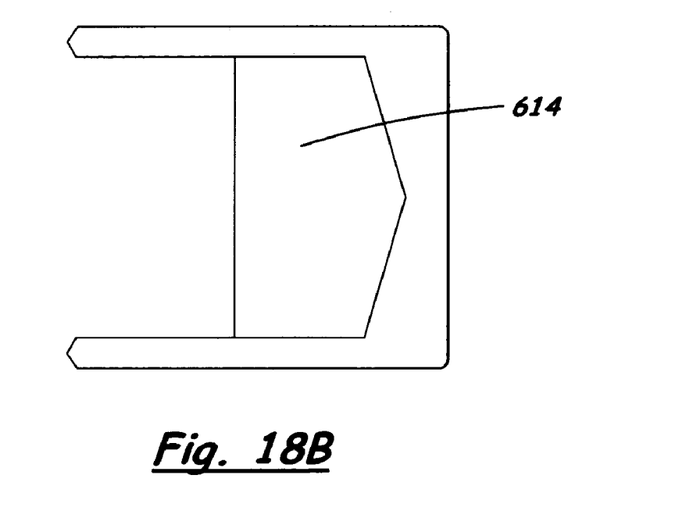
FIG. 18B is a partial top view of an alternative mouthpiece with a general flat shelf stepped down from the surrounding surfaces and without a bowl, depression or canal.

Mouthpieces made according to the invention may include very different contours, breaklines, and apertures. As shown in FIGS. 18A and B, the sound-producing "shelf" need not always include a structure that may be called a canal. Further, the shelf need not always include a curved breakline, but rather may have a generally straight edge at the distal edge of the recesses/contoured surfaces. Thus, the recessed/contoured surfaces may be complex or simple; may smoothly transition, or abruptly transition, from surrounding surfaces; may or may not include "bowls", "canals", "depressions"; and in general may have a great variety of surfaces and shapes, as long as a portion of reed may vibrate in air near said surfaces to create sounds that may attract various animals.

Figure 19:
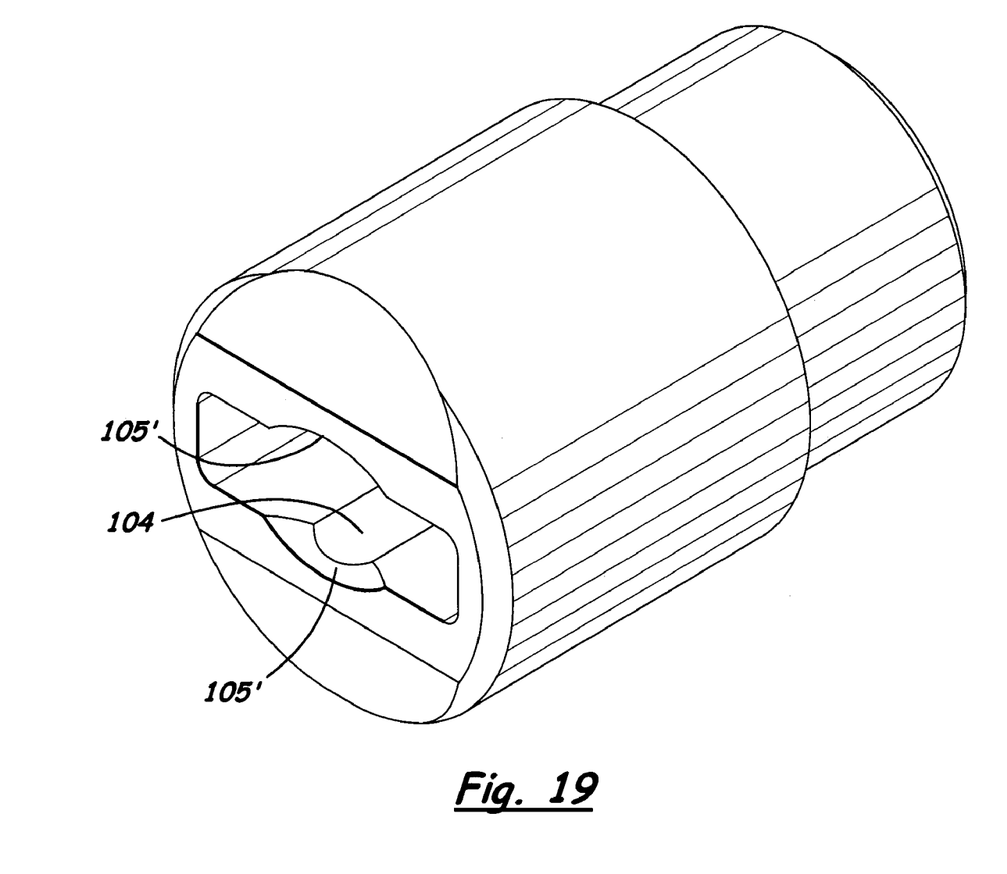
FIG. 19 is a proximal view of an alternative embodiment of a housing with alternative shapes/slopes of interior surfaces contributing to the shape of the resonating chamber.

As shown in FIG. 19, the interior surface of the housing that surrounds and defines the resonating chamber 102 of the housing may be variously shaped to produce a desired effect. For example, the ramped sections 105 and grooves 104 may be variously shaped. In FIG. 19, there are shown wider and deeper ramped sections 105'. While the groove in FIG. 19 is shown to be the same diameter, depth, and shape as in the embodiments of FIG. 1–13, the groove may also be modified to be a different diameter, depth, or shape, as desired for different sounds.

A two-sided mouthpiece having different contours on its two sides may be used/blown in the same manner as a bilaterally symmetrical mouthpiece, or may be used/blown differently. For example, the user may change the position and/or pressure of his/her lips to emphasize one of the sides more than the other side, or to "disable" one of the sides so that its reed does not vibrate and therefore does not contribute to the call. Thus, a user may use one mouthpiece to obtain a great variety of sounds or great complexity of sounds, or two distinctly different sounds.

Although the adjustability feature discussed above is preferably used on embodiments with more than one sound-producing region or side, there may be other embodiments utilizing only one sound-producing region or side, and one reed/reed portion, which still may benefit from the adjustability feature. For example, a single-sided mouthpiece may be provided (with or without holder) with a tubular reed extending around the mouthpiece but that only vibrates on one side. The mouthpiece may be slide inward or outward to adapt to the user's lips and/or to vary the sounds produced.

Figure 20A:
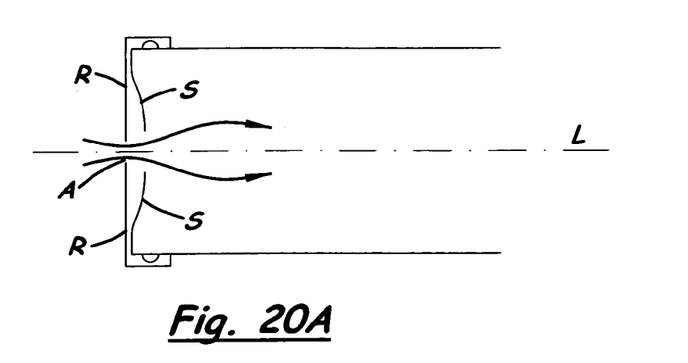
FIGS. 20A–C are schematic side views of alternative embodiments of two-sided mouthpieces, wherein the sound-producing regions are at different angles to the longitudinal axis of the mouthpiece, and wherein the arrows illustrate air flow.
Figure 20B:
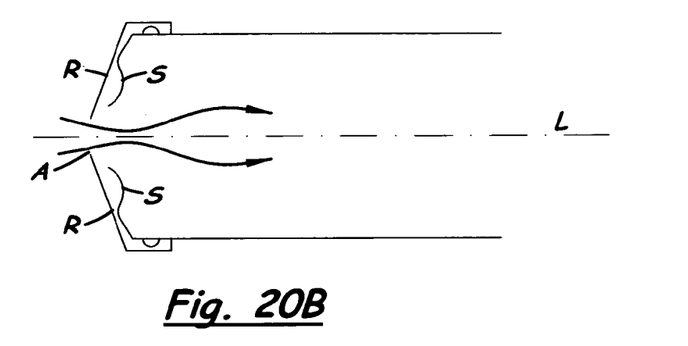
Figure 20C:
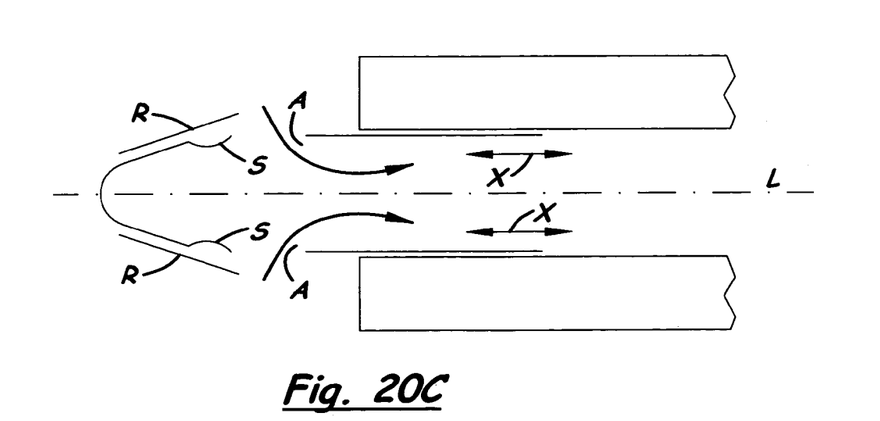

The preferred embodiment may be described as having sound-producing surfaces that are generally parallel to the longitudinal axis of the mouthpiece. The invention may include other embodiments wherein the surfaces cooperating with the reed(s), or affecting air moved by the vibrating reed(s), lie at different angles relative to the longitudinal axis. For example, the shelves S shown in FIG. 20A are generally perpendicular to axis L. The shelves S in the embodiment shown in FIG. 20B extend outward to form a more convex shape (when viewed from the proximal end), but still with a single, generally central aperture A. The shelves in FIG. 20C are slanted to be more parallel than perpendicular to axis L, in which case it may become desirable to have the reed(s) R extend over apertures A on both sides that lead to the hollow interior of the mouthpiece. Therefore, one may see that there may be a continuum of sound-producing surface angles between generally parallel to axis L and generally perpendicular to axis L, and that mouthpieces with multiple sound-producing regions according to some embodiments of the invention may be designed in a wide range of styles.

The inventors prefer that calls within the categories of "generally parallel to the axis L" of the mouthpiece include the slideable and/or adjustable feature for the mouthpiece. As discussed earlier in this Description, this slideable/adjustable mouthpiece feature may include adaptations for the sound-producing surfaces, and/or the vibrating reed(s), and/or the aperture through which air/sound waves pass into the call body, to slide or adjust between extended/lengthened positions and retracted/shortened positions. In the extended/lengthened positions, the sound-producing surfaces, reed(s), and/or aperture are moved father out from the holder or main body of the mouthpiece. In the retracted/shortened positions, the sound-producing surfaces, reed(s), and/or aperture are moved closer to the holder or main body of the mouthpiece. Preferably, this adjustability is continuous between the extremes of being far out from, and close in to, the holder/main body, but the adjustability may also be designed to be incremental. This adjustability may allow a call to better fit a particular user's mouth, lips, and teeth, and it may also or instead allow the user to alter and vary the sounds produced by a single call. This is because the adjustability of the mouthpiece may allow the user to adjust his mouth and lip position relative to the apparatus that produces the sounds and may allow the user to control/vary the dynamics of lip pressure, blowing of air, and mouth or tongue movement that may contribute to effective game calling. The preferred, but not the only, adaptation for producing this adjustability feature is shown schematically in FIG. 20C by the arrows X, wherein the mouthpiece portion slides in and out longitudinally relative to the holder/tube. Further, the inventors envision that the invented adjustability feature may be used to great advantage on various game calls, even those that are not "two-sided."

It should also be noted that, although the housing shown in the Figures has a generally cylindrical outer surface, other shapes of housings or other resonating structures may be used. For example, a housing that is generally a flattened cylinder, to more closely match the plate-like shape of the mouthpiece, may be effective. Such a flatter shape, rather than a cylindrical shape, will save plastic during molding and may be easier for the user to carry and hold. Such a flatter shape may receive the mouthpiece and holder, as described above, while still providing sufficient resonating space inside the housing.

Although this invention has been described above with reference to particular means, materials, and embodiments, it is to be understood that the invention is not limited to these disclosed particulars, but extends instead to all equivalents within the scope of the following claims.

We claim:

1. A game call comprising a mouthpiece with a plurality of reeds and separate contoured surfaces located generally under each of said reeds, wherein each one of said reeds vibrates substantially independently from the other reeds near its respective contoured surface A, wherein said mouthpiece comprises a plate with a top side and a bottom side and said contoured surfaces are located on said top and bottom sides.

2. A game call as in claim 1, wherein said plurality of reeds are portions of a tubular reed.

3. A game call as in claim 1, wherein said plurality of reeds are portions of a tubular reed placed around said plate.

4. A game call as in claim 3, further comprising a housing comprising a resonating chamber, and wherein the mouthpiece is adjustably connected to the housing, so that the mouthpiece is adapted to be moved closer to and farther away from said housing.

5. A game call as in claim 4, wherein said housing has a longitudinal axis and said top side and said bottom side are parallel to said longitudinal axis.

6. A game call as in claim 4, wherein said mouthpiece is slidably received in a slot in the housing.

7. A game call as in claim 4, wherein said mouthpiece further comprises a holder extending around at least two sides of the mouthpiece to cover a part of said tubular reed.

8. A game call as in claim 1, further comprising a housing comprising a resonating chamber, and wherein the mouthpiece is adjustably connected to the housing, so that the mouthpiece is adapted to be moved closer to and farther away from said housing.

9. A game call as in claim 8, wherein said housing has a longitudinal axis and said top side and said bottom side are parallel to said longitudinal axis.

10. A game call as in claim 8, wherein said mouthpiece is slidably received in a slot in the housing.

11. A game call as in claim 8, wherein said plurality of reeds are portions of a tubular reed placed around said mouthpiece and said mouthpiece further comprises a holder extending around at least two sides of the mouthpiece to cover a part of said tubular reed.

12. A game call comprising a mouthpiece with a plurality of reeds and separate contoured surfaces located generally under each of said reeds, wherein each one of said reeds vibrates substantially independently from the other reeds near its respective contoured surface, wherein said reeds are portions of a tubular reed placed around the mouthpiece, said mouthpiece comprises outer support surfaces adapted to hold said tubular reed, and said contoured surfaces are recessed relative to said outer support surfaces, creating space between said contoured surfaces and said reeds to allow said reeds to vibrate over said contoured surfaces.

13. A game call as in claim 12, wherein said contoured surfaces comprise a concave bowl.

14. A game call as in claim 12, wherein said contoured surfaces comprise a concave depression.

15. A game call as in claim 12, wherein said contoured surfaces comprise a canal extending from a top surface to a bottom surface of the mouthpiece.

16. A game call as in claim 12, further comprising a housing with a resonating chamber adapted to receive the mouthpiece and an orifice through the mouthpiece in communication with said resonating chamber, said contoured surfaces comprising a curved edge at said orifice.

17. A game call as in claim 12, further comprising a housing with a resonating chamber adapted to receive the mouthpiece and an orifice through the mouthpiece in communication with said resonating chamber, said contoured surfaces comprising a straight edge at said orifice.

18. A game call comprising:
a mouthpiece with at least one reed portion and at least one recessed surface located generally under each reed portion; and
a housing comprising a resonating chamber;
wherein said mouthpiece is adjustably connected to the housing so that the at least one reed portion and at least one recessed surface are movable toward and away from the housing, wherein said mouthpiece comprises a plate with top and bottom sides and one of said at least one recessed surfaces is located on each of said top and bottom sides.

19. A game call as in claim 18, comprising two of the at least one reed portions, wherein said two reed portions are adapted to vibrate at or near said recessed surfaces and resulting sounds travel into said resonating chamber.

20. A game call as in claim 18, comprising two of said reed portions, and wherein said two reed portions are portions of a tubular reed.

21. A game call as in claim 18, comprising two of said reed portions, and wherein said two reed portions are portions of a tubular reed placed around said plate.

22. A game call as in claim 18, wherein said housing has a longitudinal axis and said top side and said bottom side are parallel to said longitudinal axis.

23. A game call as in claim 18, wherein said resonating chamber has an opening and said mouthpiece is slidably received in said opening.

24. A game call comprising:
a mouthpiece with at least one reed portion and at least one recessed surface located generally under each reed portion; and
a housing comprising a resonating chamber;
wherein said mouthpiece is adjustably connected to the housing so that the at least one reed portion and at least one recessed surface are movable toward and away from the housing, wherein said at least one reed portion is a portion of a cylindrical reed placed around said mouthpiece and said mouthpiece further comprises a holder extending around at least two sides of the mouthpiece to cover a part of said cylindrical reed.

25. A game call comprising:
a mouthpiece with at least one reed portion and at least one recessed surface located generally under each reed portion; and
a housing comprising a resonating chamber;
wherein said mouthpiece is adjustably connected to the housing so that the at least one reed portion and at least one recessed surface are movable toward and away from the housing, wherein said at least one reed portion is a portion of a tubular reed
placed around the mouthpiece, and wherein said mouthpiece comprises outer support surfaces adapted to hold said tubular reed, and wherein said at least one recessed surface is recessed relative to said outer support surfaces, creating space between said recessed surface and said reed portion to allow said reed portion to vibrate over said recessed surface.

26. A game call as in claim 25, wherein said recessed surface comprises a concave bowl.

27. A game call as in claim 25, wherein said recessed surface comprises a concave depression.

28. A game call as in claim 25, wherein said recessed surface comprises a canal extending from a top surface to a bottom surface of the mouthpiece.

29. A game call as in claim 25, further comprising an orifice through the mouthpiece in communication with said resonating chamber, said recessed surface comprising a curved edge at said orifice.

30. A game call as in claim 25, further comprising an orifice through the mouthpiece in communication with said resonating chamber, said recessed surface comprising a straight edge at said orifice.

* * * * *